United States Patent Office
3,444,165
Patented May 13, 1969

3,444,165
PROCESS FOR THE PREPARATION OF
PYRAZINOYLGUANIDINES
Peter I. Pollak, Scotch Plains, and Roger J. Tull, Metuchen, N.J., assignors to Merck & Co., Inc., Rahway, N.J., a corporation of New Jersey
No Drawing. Filed Aug. 25, 1966, Ser. No. 574,906
Int. Cl. C07d 51/62; C07c 129/04, 129/12
U.S. Cl. 260—250                                    2 Claims

ABSTRACT OF THE DISCLOSURE

A process is described for the preparation of pyrazinoylguanidines which comprises the treatment of an alkali metal salt of a pyrazinoic acid amide with a 1-amidinopyrazole. The products have utility as diuretics.

---

This invention is concerned with a novel process for the preparation of (3,5-diamino-6-halopyrazinoyl)guanidine and (3,5 - diamino-6-halopyrazinamido)guanidine compounds which possess useful diuretic properties but more importantly they selectively enhance the excretion of sodium and chloride ions while suppressing the excretion of potassium. The products prepared by the novel process of this invention are especially useful in the treatment or management of edema and other abnormalities resulting from the retention of excess quantities of sodium and fluid by the animal organism.

Acylguanidines and acylamidoguanidines had been prepared by the reaction of alkyl esters of organic acids with guanidines and aminoguanidines respectively. This method results in a relatively low yield of the desired product and considerable quantities of cyclized by-products may be produced.

It has been discovered that these prior difficulties can be overcome by preparing pyrazinoylguanidines and pyrazinamidoguanidines by the reaction of a pyrazinoic acid amide or hydrazide respectively with a 3,5-di-substituted-1-amidinopyrazole salt.

While the novel method of this invention can be employed to produce substantially any (3,5-diamino-6-halopyrazinoyl)guanidine and (3,5 - diamino-6-halopyrazinamido)guanidine product, the reaction is particularly useful in the preparation of products having the following structural formula

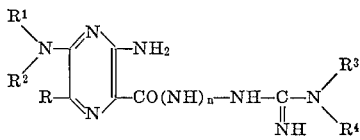

and acid addition salts thereof wherein R is halogen, particularly chloro or bromo; $R^1$ and $R^2$ can be the same or dissimilar groups selected from hydrogen, lower alkyl advantageously having from 1 to 5 carbon atoms as methyl, ethyl, propyl, isopropyl, butyl, amyl, or any of the branched 4 or 5 carbon alkyl groups, lower alkenyl advantageously having from 3 to 5 carbon atoms and particularly the allyl, propargyl or 3-pentenyl and the like, or a lower(cycloalkyl-alkyl) group advantageously having from 4 to 8 carbons in the group such as the cyclopropylmethyl, cyclopentylmethyl, cyclohexylmethyl, cyclohexylethyl, cyclopropylethyl and the like; $R^3$ represents hydrogen, a lower alkyl advantageously having from 1 to 5 carbon atoms, such as methyl, ethyl, propyl, isopropyl, butyl, amyl, or any of the branched 4 or 5 carbon lower alkyl groups, or substituted lower alkyl groups having from 1 to 5 carbon atoms and particularly those containing hydroxy or a phenyl substituent, the phenyl lower alkyl advantageously having an alkyl moiety of 1 to 2 carbon atoms; $R^4$ advantageously is hydrogen, lower alkyl having 1 to 5 carbon atoms such as methyl, ethyl, propyl, isopropyl, butyl, amyl or any of the branched 4 or 5 carbon alkyl groups, and $n$ is zero or one.

The novel process of this invention can be illustrated by the following reaction scheme wherein the variable radicals have the meaning assigned to each of them above:

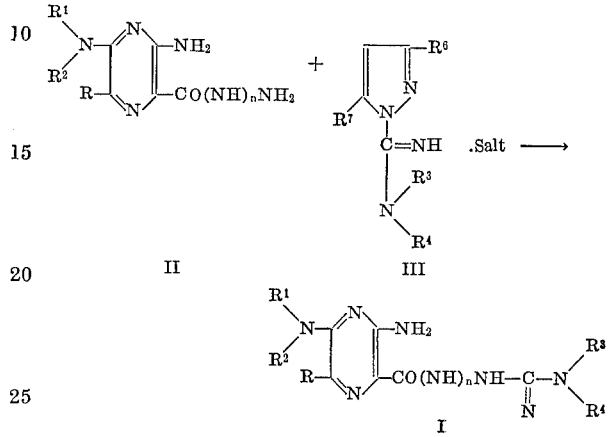

The novel process of this invention comprises the reaction of the pyrazinoic acid amide preferably in the form of its alkali metal salt or the pyrazinoic acid hydrazide with a 3,5-disubstituted-1-amidinopyrazole under anhydrous conditions and at a temperature ranging between 0–60° C. Advantageously the pyrazinoic acid amide and an alkali metal hydroxide such as potassium hydroxide, sodium hydroxide, lithium hydroxide and the like, in an anhydrous solvent such as anhydrous ethanol, propanol, isopropanol and the like, are reacted at room temperature or slightly below or above room temperature. The alkali metal salt of the amide precipitates as it is formed and is collected under anhydrous conditions.

The alkali metal amidate or the acid hydrazide is suspended in dry dimethylformamide, dimethyl sulfoxide, glyme, diglyme, an alcohol or a similar organic solvent which in the case of the acid hydrazide contains a mole of base such as an alkali metal hydrazide or alkoxide. An equimolecular quantity of the selected 3,5-disubstituted-1-amidinopyrazole salt III is added and the mixture then stirred at a temperature ranging from about ice-bath temperature to about 100° C. until the reaction is completed. Thereafter the solvent is removed preferably by vacuum distillation and the residue slurried with a mineral acid which advantageously can be hydrochloric acid or hydrobromic acid thus forming the insoluble hydrohalide salt of the desired (3,5-diamino-6-halopyrazinoyl)guanidine or (3,5-diamino-6-halopyrazinamido)guanidine.

The pyrazinoic acid amide (II, $n=0$) employed in the above reaction can be prepared by the reaction of the appropriate alkyl 3,5-diamino-6-halopyrazinoate with ammonia. Reaction can be conducted using liquid ammonia at temperatures slightly below or slightly above ambient temperature or, the ester can be dissolved in an inert solvent and ammonia admitted below the surface of the solution.

The pyrazinoic acid hydrazide (II, $n=1$) is prepared by the reaction of the appropriate alkyl ester of 3,5-diamino-6-halopyrazinoic acid with hydrazine, advantageously with moderate heating.

The 3,5-disubstituted-1-amidinopyrazole salt, III, can be prepared according to a procedure which comprises addition of an aminoguanidine salt to an equimolar amount of bis (acyl or aroyl) methylene such as 2,4-pentanedione, benzoylacetone, benzoylacetophenone, or phenylacetylacetone or the like in aqueous ethanol and refluxing for about five hours, cooling, and collecting the crystals. For example:

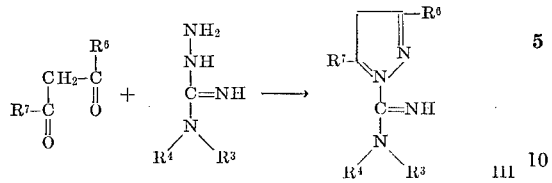

wherein $R^6$ and $R^7$ are lower alkyl, phenyl lower alkyl, substituted phenyl lower alkyl, such as with halo, lower alkyl or lower-alkoxy; phenyl, or substituted phenyl. Advantageously $R^6$ and $R^7$ are methyl. The nature of the substitutents $R^6$ and $R^7$ are not important for the purpose of this invention, as they do not appear in the final product.

The following examples illustate the novel method of this invention and are not to be considered as limiting the invention to the particular compounds or the particular reaction conditions specifically employed but are to be considered representative of the reaction conditions described above which are suitable for the preparation of the products having structure I in the foregoing discussion.

EXAMPLE 1

(3,5-diamino-6-chloropyrazinoyl)guanidine

Step A: Preparation of 3,5-diamino-6-chloropyrazinamide.—Methyl 3,5-diamino-6-chloropyrazinoate (0.1 mole) is added to liquid ammonia (200 ml.) and the reaction mixture is heated at 100° C. for 12 hours. The ammonia is expelled and the product is removed from the autoclave and recrystallized from methanol to give a 90% yield of 3,5-diamino-6-chloropyrazinamide, melting point 218.5–220.5° C.

Step B: Preparation of (3,5-diamino-6-chloropyrazinoyl)-guanidine.—One mole of 6-chloro-3,5-diaminopyrazinoic acid amide is dissolved in one liter of anhydrous isopropanol. While stirring, one mole of solid potassium hydroxide is added. After the potassium hydroxide dissolves, the precipitate of the potassium salt of the amide is collected under anhydrous conditions and suspended in one liter of dry dimethylformamide. This suspension then is treated at 5° C. with one mole of 3,5-dimethyl-1-amidinopyrazolenitrate. The mixture is stirred in an ice bath for one week and the solvent that is removed by vacuum distillation. The residue is slurried with 200 ml. of 6 N hydrochloric acid and the insoluble (3,5-diamino-6-chloropyrazinoyl)guanidine hydrochloride is collected, washed with cold water and dried, melting point 293.5° C. (dec.).

EXAMPLE 2

(3,5-diamino-6-bromopyrazinoyl)guanidine

By replacing the methyl 3,5-diamino-6-dichloropyrazinoate employed in Example 1, Step A, by an equimolecular quantity of methyl 3,5-diamino-6-bromopyrazinoate and following substantially the same procedure described in Example 1, Steps A and B, there is obtained (3,5-diamino-6-bromopyrazinoyl)guanidine hydrochloride which in the form of its free base melts at 232.5–235.5° C.

Other (3-amino-5-$NR^1R^2$-6-halopyrazinoyl)guanidine products prepared by the novel process of this invention are identified in the following table. The reaction employed in preparing these compounds is illustrated in the heading of the following table. The products are prepared by reacting a pyrazinoic acid ester of structure A with ammonia as described in Example 1, Step A, and then reacting the thus formed pyrazinoic acid amide with a 3,5-dimethyl-1-amidinopyrazole of structure C. Each of the intermediate products have the substituent groups identified for it in the table under the heading $R^1$, $R^2$, $R^3$ and $R^4$, thus forming the pyrazinoylguanidine end product having structure D in the heading of the following table. The reaction conditions are essentially those described in Example 1. Steps A and B, which were modified in some instances in the manner hereinbefore described in discussing the novel process of this invention.

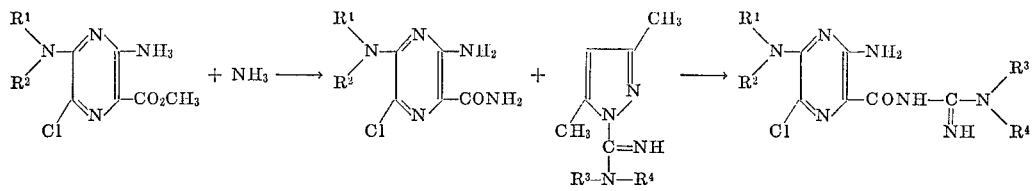

| $R^1$ | $R^2$ | $R^3$ | $R^4$ | M.P. °C. (d) of end product [1] |
|---|---|---|---|---|
| H | H | $CH_3$ | H | 252–254. |
| H | H | $CH_3$ | $CH_3$ | HCl monohydrate 277. |
| H | H | $-CH_2CH_2OH$ | H | HCl 228.5–229.5. |
| H | H | $-CH_2-\langle \rangle$ | H | 215–216. |
| H | H | $-CH_2CH_2-\langle \rangle$ | H | 219–221.5. |
| H | —iPr | $CH_3$ | H | >300. |
| H | —iPr | $CH_3$ | $CH_3$ | 238.5–240. |
| H | —iPr | $-CH_2CH_2OH$ | H | HCl-hemihydrate 185–186. |
| H | —iPr | $CH_2-\langle \rangle$ | H | 200.5–204.5. |
| H | $-CH_2CH=CH_2$ | H | H | 213–214. |
| H | $-CH_2CH=CH_2$ | $CH_3$ | $CH_3$ | 213–215. |
| H | nBu | $CH_3$ | $CH_3$ | 187.5. |
| H | $CH_2-\langle H \rangle$ | H | H | 200–221.5. |
| $CH_3$ | $CH_3$ | H | H | 216–217. |
| $CH_3$ | $C_2H_5$ | H | H | 229–230. |
| $CH_3$ | nPr | H | H | 214–215. |
| $CH_3$ | —iPr | H | H | 207–208. |
| $CH_3$ | —iPr | $CH_3$ | $CH_3$ | 209–211. |
| Et | Et | $CH_3$ | $CH_3$ | 212–214. |

[1] As free base unless otherwise noted.

EXAMPLE 3

(3,5-diamino-6-chloropyrazinamido)guanidine 3,5-dimethyl-1-amidinopyrazole (0.10 mole), 0.1 mole of 3,5-diamino-6-chloropyrazinoic acid hydrazide and 0.1 mole of sodium methoxide are dissolved in 100 ml. of ethanol and heated under reflux for 2 hours in a carbon dioxide-free atmosphere. The solution is evaporated to dryness in vacuo and the residue is slurried in 50 ml. of 6 N hydrochloric acid. The insoluble (3,5-diamino-6-chloropyrazinamido)guanidine hydrochloride is collected, washed with cold water and dried, M.P. 281-2° C.

Other (3-amino-5-$NR^1R^2$-6-chloropyrazinamido)guanidine products prepared by the novel process of this invention are identified in the following Table II. The products are prepared by reacting a pyrazinoic acid hydrazide of structure E with a 3,5-dimethyl-1-amidinopyrazole of structure C. Each of the starting materials and products have the substituent groups identified for it in the table under the headings $R^1$, $R^2$, $R^3$, $R^4$. The reaction conditions are essentially those described in Example 3 which were modified in some cases in the manner hereinbefore described in discussing the novel process of this invention.

What is claimed is:

1. The process wherein a compound having the structure IIa is caused to reacted with a compound of structure III in an anhydrous solvent to form an end product of structure I:

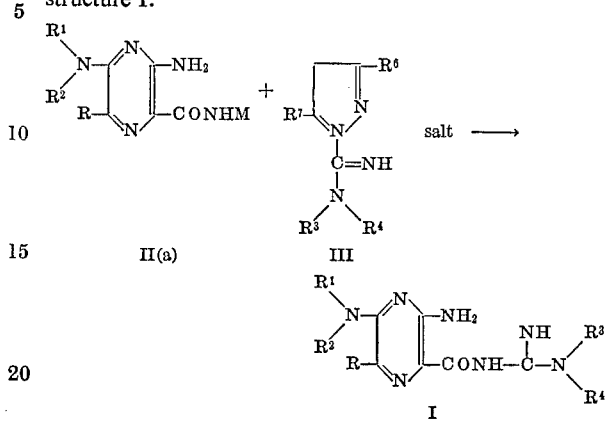

wherein in each of the foregoing structures:

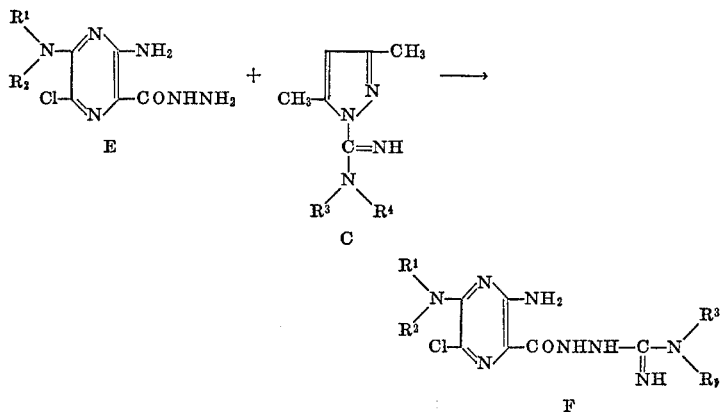

| R¹ | R² | R³ | R⁴ |
|---|---|---|---|
| CH₃ | CH₃ | H | H |
| H | H | CH₃ | CH₃ |
| H | H | CH₃ | H |
| H | H | HOCH₂CH₂ | H |
| H | H | C₆H₅—CH₂CH₂ | H |
| H | H | C₆H₅—CH₂— | H |
| H | —iPr | CH₃ | H |
| H | —iPr | CH₃ | CH₃ |
| H | —iPr | HOCH₂CH₂— | H |
| H | —iPr | C₆H₅—CH₂ | H |
| H | —CH₂CH=CH₂ | H | H |
| H | —CH₂CH=CH₂ | CH₃ | CH₃ |
| H | nBu | CH₃ | CH₃ |
| H | CH₂—cyclopropyl | H | H |
| CH₃ | C₂H₅ | H | H |
| CH₃ | nPr | H | H |
| CH₃ | —iPr | H | H |
| CH₃ | —iPr | CH₃ | CH₃ |
| Et | Et | CH₃ | CH₃ |

M is alkali metal;

R is a member selected from the group consisting of chloro and bromo;

$R^1$ and $R^2$ are members selected from the group consisting of hydrogen, lower alkyl, lower alkenyl, lower (cycloalkylalkyl);

$R^3$ is a member selected from the group consisting of hydrogen, lower alkyl, hydroxy lower alkyl, phenyl lower alkyl;

$R^4$ is a member selected from the group consisting of hydrogen, lower alkyl;

$R^6$ and $R^7$ separately are members selected from the group consisting of lower alkyl, phenyl, phenyl lower alkyl.

2. A process as claimed in claim 1 wherein 3,5-diamino-6-chloropyrazinoic acid amide is caused to react with 3,5-dimethyl-1-amidinopyrazole to form (3,5-diamino-6-chloropyrazinoyl)guanidine.

References Cited

Scott et al.: J. Am. Chem. Soc., 75, 4053–54 (1953).

NICHOLAS S. RIZZO, *Primary Examiner.*

R. V. RUSH, *Assistant Examiner.*

U.S. Cl. X.R.

260—310; 424—250